March 4, 1930. D. H. DAVIS ET AL 1,748,976
POLE TRAILER
Filed April 11, 1927
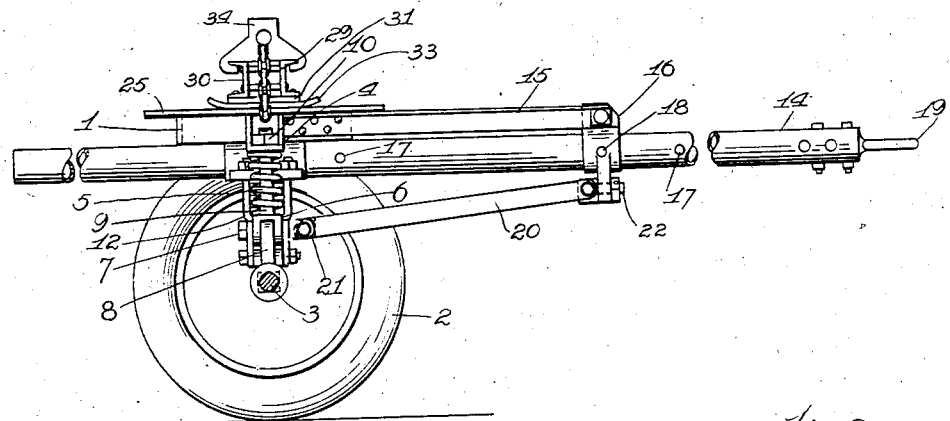
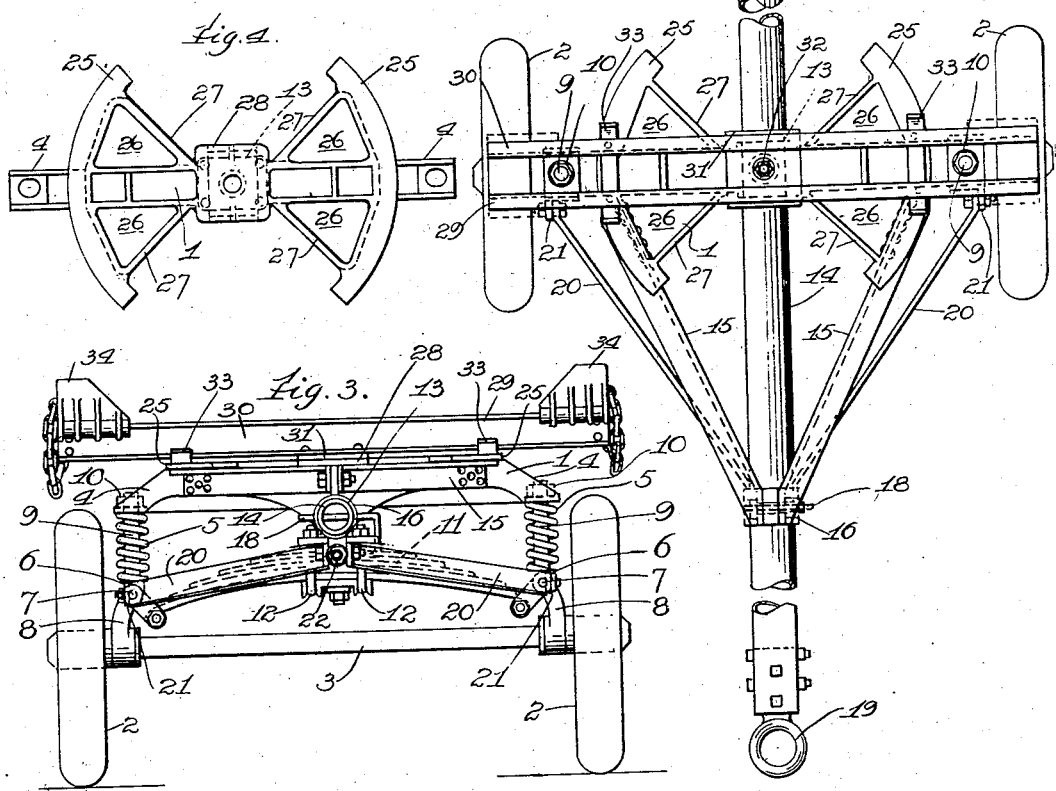
Inventor.
Durrel H. Davis &
Leroy E. Williams.
by their Attorneys.
Witness.
H. C. McKnight.

Patented Mar. 4, 1930

1,748,976

UNITED STATES PATENT OFFICE

DURREL H. DAVIS AND LEROY E. WILLIAMS, OF EDGERTON, WISCONSIN, ASSIGNORS TO HIGHWAY TRAILER COMPANY, OF EDGERTON, WISCONSIN, A CORPORATION OF WISCONSIN

POLE TRAILER

Application filed April 11, 1927. Serial No. 182,624.

This invention relates to trailer vehicles and more particularly to those of the two wheel type, and has for its object to provide a simplified and durable construction. It consists in certain features and elements in combination, as shown and described herein and as indicated by the claims.

In the drawings:

Figure 1 is a side elevation of a two wheel trailer vehicle embodying this invention, the wheel on the near side being removed.

Figure 2, is a plan view of the same.

Figure 3, is a front end view of the trailer with the draw bar in substantially horizontal position.

Figure 4, is a plan view of the unit cast frame for the trailer.

The two wheel trailer vehicle as illustrated in the drawing, comprises a unit cast frame 1, carried on supporting wheels, 2, and axle, 3. Said frame is composed of a pair of laterally projecting arms, 4, extending in opposite directions in vertical alignment with the axle, 3. Said arms are integrally connected to the body of the cast frame, 1, by suitable reinforcing ribs to form a practically continuous beam member. A pair of coil springs, 5, are interposed between the under side of said arms, adjacent the ends, and pivot clips, 6, which are pivotally connected at 7 to axle brackets, 8, carried on said axle adjacent the wheels, 2. Said springs, 5, are mounted on upright bolts, 9, the heads of which are carried pivotally by, and may be integral with the clips, 6, the upper ends of the bolts extending through the arms, 4, and being secured by nuts, 10. A transversely extending leaf spring 11, is disposed above said axle, in alignment therewith and the ends of said spring are suitably shackled to the axle brackets 8, on the pivot, 7, at which the pivot clips, 6, are pivoted. The mid-portion of the leaf spring is secured to the under side of the frame, 1, by suitable U-bolts, 12. This spring arrangement suitably supports the frame together with the load imposed thereon and permits slight lateral play of the complete frame, springs and load, in the event of an unbalanced load.

The unit cast frame is provided with an annular opening, 13, extending longitudinally therethrough in approximately central alignment with the lower side of the arms, 4, for seating a longitudinally extending cylindrical draw bar, 14. Said draw bar is preferably of wrought iron pipe for rigidity and strength. A pair of braces, 15, extend obliquely forward from said frame, and have their forward ends attached to the upper side of a supporting ring, 16, loosely mounted about said draw bar. The draw bar is provided with a plurality of apertures, 17, spaced therealong at intervals for registration with the apertures in said ring, 16, through which a pin, 18, is disposed for securing said draw bar in a fixed relation with the vehicle. The draw bar is adjustable lengthwise with respect to said vehicles to vary its effective length. An eye, 19, is secured to the forward end of the draw bar for attaching to the usual pintle hook on the vehicle which is to pull the trailer. A pair of radius rods, 20, have their rear ends pivoted to ears 21, projecting forwardly from the axle brackets, 8, the forward ends of said rods extending obliquely toward each other and being pivotally connected to an adjustable eye bolt, 22, extending through a lug on the under side of the supporting ring 16. The connections to the vehicle proper both above and below the draw bar, are such as to cause the pull on the draw bar to be transmitted to the vehicle in balanced forces.

The upper portion of the frame comprises a pair of oppositely disposed arcuate turntable segments, 25 integral with said frame. The frame is so designed and reinforced as to secure maximum strength with minimum weight as evidenced by the cored-out portions, 26, formed by the adjacent reinforcing and connecting ribs, 27, of the frame. A rectangular shaped pivot bearing support, 28, is formed integral with the frame centrally between and in horizontal alignment with the top of said turntable segments, and is adapted to swivelly seat a bolster, 29. Said bolster comprises a pair of flanged beam members, 30, connected together in spaced relation. A bearing plate, 31, is attached to the lower flanges of said beams, and is adapted to swivel about on the bearing support, 28, of the frame 1, being pivoted thereto by a king bolt, 32, extending through said bearing plate, 31, and bearing support, 28. A pair of spaced bearing shoes, 33, are secured to the under side of said beams on opposite sides of the king bolt and have bearing support on the adjacent turntable segments, 25. A pair of chocks, 34, are slidably mounted on the upper edges of said beam members, 30, and are adjustably securable in a plurality of positions in the usual manner.

A unit cast frame for a vehicle as herein described provides a compact durable lightweight construction that may be cheaply fabricated and easily assembled. This type trailer is especially adaptable for transporting lengthy objects such as telephone poles, logs, structural members, etc., and the adjustable draw bar permits the trailer to be located the proper distance in the rear of the pulling vehicle to suitably accommodate the weight and length of such objects.

We claim:

1. In a trailer vehicle, the combination with a unitary cast frame, supporting wheels and an axle therefor, the upper surface of said frame forming a turntable, a bolster on said frame, centrally pivoted and bearing on said turntable, integral arms extending laterally from opposite sides of said turntable, vertically disposed springs, the upper ends abutting against said arms with their lower ends connected to pivot bracket members on said axle adjacent the wheels, a transversely extending leaf spring disposed above and in alignment with said axle, the middle thereof being secured to the under side of said frame and the ends of said spring being shackled to said pivot brackets; together with a draw bar connected to said frame above said leaf spring, and radius rods connected at one end to said pivot brackets, the other ends extending obliquely forward and connected together to said draw bar for guiding support therefor.

2. In a trailer vehicle, the combination with a unitary cast frame, supporting wheels and an axle therefor, said frame comprising a transversely extending beam having integral connection with segmental arcuate turntable sections disposed thereabove in coaxial relation, a bolster centrally pivoted to said frame and having shoe members disposed on the under side thereof in spaced relation providing slidable bearing support for said bolster on the turntable, vertically disposed springs interposed between the outer ends of said frame beam and the axle in yielding contact therewith at all times, together with a transversely disposed leaf spring perched on the frame at its mid-point and having its outer ends shackled to the axle.

3. In a trailer vehicle, the combination of a unitary cast frame, supporting wheels and an axle therefor, the upper side of said frame providing a turntable, a bolster centrally pivoted on said frame having its outer extensions slidably supported on said turntable, said frame having integral arms extending laterally in opposite directions, brackets mounted on said axle, upwardly extending bolts pivoted to said brackets and slidably connected at their upper end to said arms, coil springs on said bolts, in yielding contact with said arms, checking means for limiting the rebound of the frame with respect to the axle, and a leaf spring extending transversely above the axle, connected at its mid-point to said frame, with its outer ends shackled to said brackets.

DURREL H. DAVIS.
LEROY E. WILLIAMS.